(12) United States Patent
Kaneko

(10) Patent No.: US 6,654,153 B2
(45) Date of Patent: Nov. 25, 2003

(54) SEMICONDUCTOR SATURABLE ABSORBER-BASED OPTICAL DOMAIN OPTICAL SIGNAL SAMPLING DEVICE FOR SAMPLING AN OPTICAL SIGNAL

(75) Inventor: Yasuhisa Kaneko, Kawasaki (JP)

(73) Assignee: Agilent Technologies, Inc., Palo Alto, CA (US)

( * ) Notice: Subject to any disclaimer, the term of this patent is extended or adjusted under 35 U.S.C. 154(b) by 114 days.

(21) Appl. No.: 10/011,175

(22) Filed: Nov. 30, 2001

(65) Prior Publication Data

US 2002/0105711 A1 Aug. 8, 2002

(30) Foreign Application Priority Data

Dec. 1, 2000 (JP) ........................................ 2000-366821

(51) Int. Cl.$^7$ ............................... G02F 1/03; G02F 1/07
(52) U.S. Cl. ...................... 359/248; 359/264; 257/347; 257/14
(58) Field of Search ................................ 359/237, 248, 359/264, 321; 257/347, 353, 14, 21, 22, 184, 185, 186, 431, 432

(56) References Cited

U.S. PATENT DOCUMENTS

| | | | | |
|---|---|---|---|---|
| 4,851,767 A | * | 7/1989 | Halbout et al. | ............. 324/754 |
| 5,256,968 A | * | 10/1993 | Loualiche et al. | ............. 324/96 |
| 6,327,399 B1 | * | 12/2001 | Fields et al. | .................. 385/19 |
| 6,459,522 B2 | * | 10/2002 | Yariv | ......................... 359/264 |
| 6,564,160 B2 | * | 5/2003 | Jungerman et al. | ......... 702/106 |

OTHER PUBLICATIONS

Whiteley, Wesley C. et al., "50 MHz Sampler Hybrid Utilizing a Small Shockline and an Internal SRD" IEEE MTT–S Digest, 1991, pp. 895–898.

Miller, D.A.B. et al. "Large Room–Temperature Optical Nonlinearity in GaAs/Ga$_{1-x}$Al$_x$As Multiple Quantum Well Structures", Applied Physics Letter, 41(8), Oct. 15, 1982, pp. 679–681.

Takahashi, R. et al., "Ultrafast 1.55 um All–Optical Switching Using Low–Temperature–Grown Multiple Quantum Wells", Applied Physics Letter 68(2), Jan. 8, 1996, pp. 153–155.

Nishikawa, Yuji et al., "Ultrafast All–Optical Spin Polarization Switch Using Quantum–Well Etalon", IEEE Journal of Selected Topics in Quantum Electronics, vol. 2, No. 3, Sep. 1996.

* cited by examiner

*Primary Examiner*—Ricky Mack
*Assistant Examiner*—Brandi N Thomas
(74) *Attorney, Agent, or Firm*—Ian Hardcastle

(57) ABSTRACT

The optical domain optical signal sampling device is for sampling an optical signal-under-test and comprises a semiconductor saturable absorber, an optical sampling pulse source, an optical signal input and a light detector. The optical sampling pulse source is arranged to illuminate the semiconductor saturable absorber with optical sampling pulses. The optical signal input is arranged to illuminate the semiconductor saturable absorber with the optical signal-under-test. The light detector is arranged to receive optical samples of the optical signal-under-test output by the semiconductor saturable absorber in response to the optical sampling pulses.

19 Claims, 5 Drawing Sheets

SEMICONDUCTOR SATURABLE ABSORBER-BASED OPTICAL DOMAIN OPTICAL SIGNAL SAMPLING DEVICE FOR SAMPLING AN OPTICAL SIGNAL

BACKGROUND OF THE INVENTION

The sampling oscilloscope is among the measurement devices used to determine the modulation waveform of modulated optical signals such as those used in optical telecommunications. Conventional sampling oscilloscopes incorporate a conventional optical signal sampling device that first converts the optical signal into an electrical signal using a photodetector. The waveform of the electrical signal is then measured using an electrical sampling circuit.

FIG. 1 is a block diagram of an example of a conventional optical signal sampling device 10 for sampling an optical signal. The optical signal sampling device is composed of the photodetector 12, the electrical sampling circuit 14 and the optical signal input 16. The optical signal-under-test is received via the optical signal input. In this example, the optical signal input is composed of the input fiber 18 and the converging element 20. The converging element converges the optical signal-under-test received via the input fiber onto the photodetector. The photodetector generates an electrical signal in response to the optical signal-under-test, and the electrical signal is sampled by the electrical sampling circuit.

The maximum frequency capability of the photodetector 12 needs to be several times the maximum frequency of the modulation waveform of the optical signal-under-test. In the example shown, the photodetector includes the photodiode 22. The photodiode is DC biased by the DC bias source 24. Currently-available PIN diodes suitable for use as the photodiode have a maximum frequency of about 110 GHz. The photodetector may alternatively include an avalanche photodiode, but an avalanche photodiode has a maximum frequency similar to that of a PIN diode.

The electrical sampling circuit 14 is composed of the sampling element 30, the sampling pulse generator 32 and the clock pulse generator 34. The sampling element includes the electrical signal input 42, the sampling signal input 44 and the electrical sample output 46. The sampling element is typically composed of a resistor, a capacitor, and a diode, none of which is shown. The output of the clock pulse generator is connected to the input of the sampling pulse generator. The output of the sampling pulse generator is connected to the sampling signal input 44 of the sampling element. The electrical signal input 42 of the sampling element is connected to the output of the photodetector 12. The electrical sample output 46 of the sampling element provides electrical samples each of which represents a portion of the modulation waveform of the optical signal-under-test. Also shown are the integrating capacitor 50 and the buffer amplifier 52 that respectively integrate and buffer the electrical samples generated by the electrical sampling circuit 14 to generate an electrical output signal whose waveform represents the modulation waveform of the optical signal-under-test.

The clock pulse generator 34 generates electrical pulses having a duration of a few nanoseconds. The sampling pulse generator 32 compresses the electrical pulses received from the clock pulse generator to generate electrical sampling pulses having a duration of a few tens of picoseconds. The sampling pulse generator may include, for example, non-linear transmission line (NLTL), a step recovery diode and a strip line, none of which is shown. The sampling pulse generator supplies the sampling pulses to the sampling element 30.

Currently, the maximum modulation frequency that can be measured using a sampling oscilloscope incorporating the conventional optical signal sampling device as just described is about 50 GHz. As the capacity of optical telecommunications has grown in recent years, the modulation rates of optical signals have reached 80 Gbps or more. It is predicted that sampling devices for measuring the waveforms of optical signals modulated at such high modulation rates will need a frequency response that extends to over 200 GHz. It is difficult to sample optical signals with such high modulation rates using conventional electrical sampling. A frequency response that extends to over 200 GHz needs samples having a duration of about 2 ps. It is extremely difficult to generate the electrical sampling pulses required to generate such short-duration electrical samples using a conventional NLTL. Moreover, propagation losses in the strip line become significant at such high frequencies. Therefore, a need exists for an optical signal sampling device capable of accurately sampling a modulated optical signal, and especially an optical signal modulated at a modulation frequency in the frequency range in which electrical sampling is difficult or impossible.

In addition, many optical telecommunication systems employ wavelength-division multiplexing (WDM). WDM increases the transmission capacity of an optical telecommunication system without increasing the transmission rate. In WDM, a transmission channel carries many optical signals, each of a different wavelength. What is also needed is the ability to measure the modulation waveforms of the individual optical signals, each of which has a different wavelength and a different modulation waveform.

SUMMARY OF THE INVENTION

The invention provides an optical domain optical signal sampling device for sampling an optical signal-under-test. The optical domain optical signal sampling device comprises a semiconductor saturable absorber, an optical sampling pulse source, an optical signal input and a light detector. The optical sampling pulse source is arranged to illuminate the semiconductor saturable absorber with optical sampling pulses. The optical signal input is arranged to illuminate the semiconductor saturable absorber with the optical signal-under-test. The light detector is arranged to receive optical samples of the optical signal-under-test output by the semiconductor saturable absorber in response to the optical sampling pulses.

The semiconductor saturable absorber enables the optical domain optical signal sampling device to sample the optical signal-under-test in the optical domain. Optical sampling pulse sources capable of repetitively generating pulses of light having a duration of a few picoseconds and with an intensity sufficiently high to induce saturable absorption in the semiconductor saturable absorber are commercially available. When illuminated with such short optical sampling pulses and the optical signal-under-test, the semiconductor saturable absorber outputs optical samples of the optical signal-under-test. The optical samples have a duration similar to that of the optical sampling pulses. The light detector converts the optical samples into an electrical signal that represents the modulation waveform of the optical signal-under-test. The frequency response of the light detector need not extend significantly higher in frequency than that of the modulation waveform of the optical signal-under-test. Such light detectors are also commercially available. Thus, the optical domain optical signal sampling device according to the invention can sample modulated optical signals and can provide a frequency response extending to beyond 200 GHz.

The optical sampling pulse source may include a laser that generates pulses of light having a pulse width of no more than 10 ps and the semiconductor saturable absorber may include a semiconductor material with a carrier lifetime of no more than 10 ps.

The semiconductor saturable absorber may include a semiconductor layer comprising semiconductor material having a short carrier lifetime. Semiconductor material having a short carrier lifetime generates the optical samples with a duration comparable with that of the optical sampling pulses and increases the wavelength range over which saturable absorption is induced. The semiconductor material having a short carrier lifetime may include low-temperature-deposited semiconductor material or ion implanted semiconductor material, for example.

The semiconductor layer may be a layer of bulk semiconductor material or a layer of graded-composition semiconductor material. Alternatively, the semiconductor layer may have a multiple quantum well structure.

The light detector may be arranged to receive the optical samples of the optical signal-under-test transmitted through the semiconductor saturable absorber. Alternatively, the semiconductor saturable absorber may include a reflective layer and the light detector is arranged to receive the optical samples of the optical signal-under-test reflected through the semiconductor saturable absorber by the reflective layer.

The light detector generates an electrical signal in response to the optical samples of the optical signal-under-test, and the optical domain optical signal sampling device may additionally comprise elements that increase the signal-to-noise ratio of the electrical signal.

In embodiments in which the optical signal-under-test is linearly polarized and has a direction of polarization, the elements for increasing the signal-to-noise ratio may include a polarization analyzer and an element that linearly polarizes the optical sampling pulses with a direction of polarization orthogonal to the direction of polarization of the optical signal-under-test. The polarization analyzer is interposed between the semiconductor saturable absorber and the light detector, and has a polarization direction of maximum transmission parallel to the direction of polarization of the optical signal-under-test. Alternatively, the elements for increasing the signal-to-noise ratio may include quantum wells in the semiconductor saturable absorber, a polarization analyzer and an element that circularly polarizes the optical sampling pulses. The polarization analyzer is interposed between the semiconductor saturable absorber and the light detector, and has a polarization direction of maximum transmission orthogonal to the direction of polarization of the optical signal-under-test.

In embodiments in which the optical signal-under-test has an indeterminate polarization, the elements for increasing the signal-to-noise ratio includes quantum wells in the semiconductor saturable absorber; elements that derive left-handed and right-handed circularly polarized optical sampling pulse components from the optical sampling pulses and illuminate a first region and a second region of the semiconductor saturable absorber with the left-handed and the right-handed circularly polarized optical sampling pulse components, respectively; elements that derive from the optical signal-under-test a first polarization component and a second polarization component having orthogonal directions of polarization, and that illuminate the first region and the second region of the semiconductor saturable absorber with the first and the second polarization components, respectively; and first and second polarization analyzers that are interposed between the semiconductor saturable absorber and the light detector in the path of optical samples generated from the first and the second polarization components, respectively, and that each have a respective polarization direction of maximum transmission orthogonal to the direction of polarization of the first and the second polarization components, respectively.

DETAILED DESCRIPTION OF THE INVENTION

Figure 1:
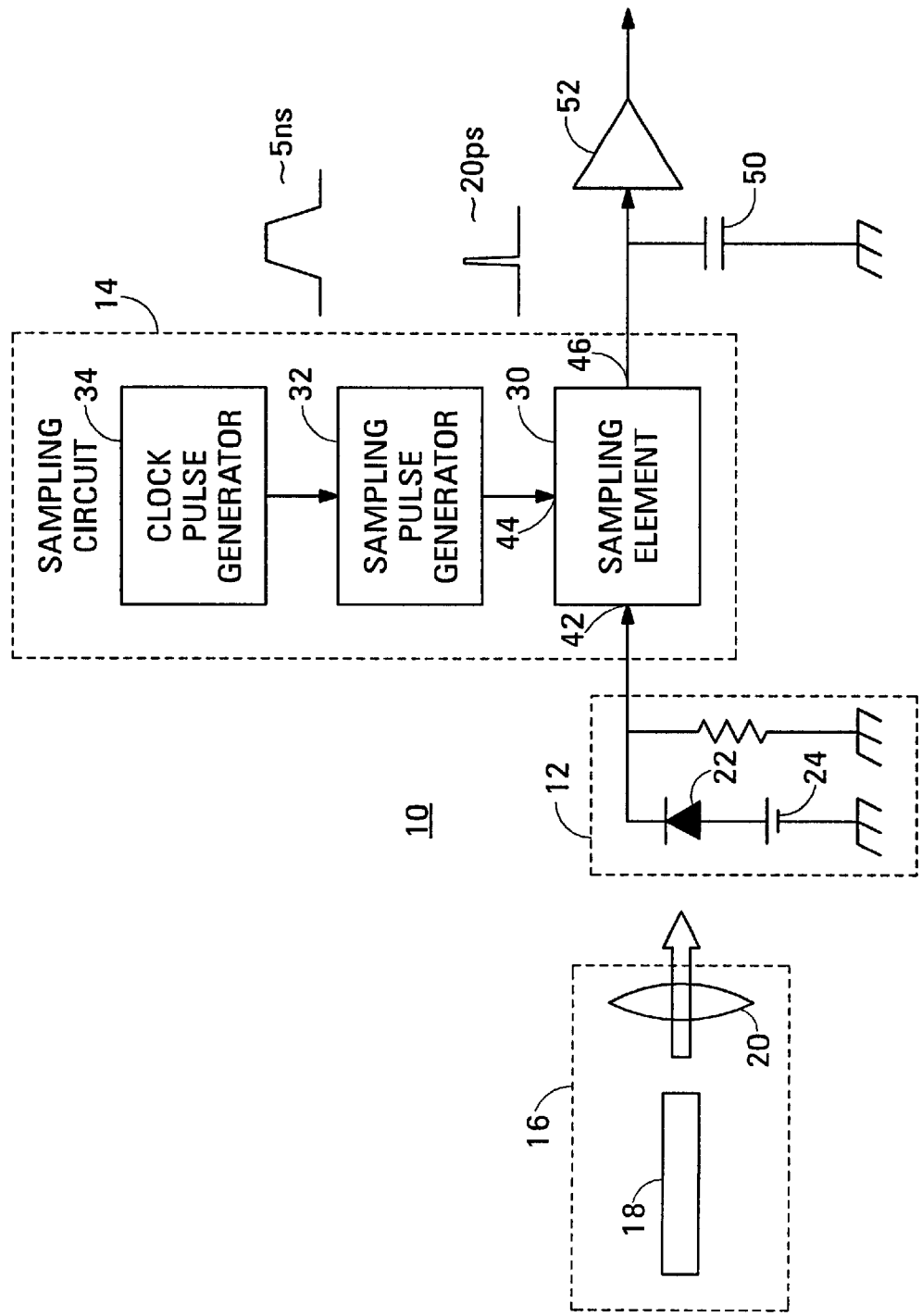
FIG. 1 is a block diagram of an example of a conventional optical signal sampling device in which sampling is performed in the electrical domain.

The invention solves the above-stated problems by sampling the optical signal-under-test in the optical domain using a semiconductor saturable absorber illuminated by optical sampling pulses. Optical samples of the optical signal-under-test output by the semiconductor saturable absorber are then converted into an electrical signal using a photodetector.

A semiconductor material illuminated with light of a specific wavelength absorbs the light, and the light generates electrons and holes in the semiconductor material. Where appropriate, electrons and holes will be collectively referred to as carriers in this disclosure. Illuminating the semiconductor material with light of a sufficient intensity reduces the absorption coefficient of the semiconductor material and changes the refractive index of the semiconductor material. The mechanism that leads to the reduction in the absorption coefficient is called saturable absorption. The absorption coefficient is reduced because the carriers generated by the light fill the entire energy level corresponding to the wavelength of the light. This prevents any further carriers from being generated, and is called the band filling effect. Because no more carriers can be generated, no more light can be absorbed, and the light instead passes through the semiconductor material. Thus, illuminating the semiconductor material with light of a sufficient intensity sets the semiconductor material to a substantially transparent state.

In accordance with the invention, a semiconductor saturable absorber is illuminated with both optical sampling pulses and the optical signal-under-test. The optical sampling pulses each have an intensity sufficient to induce saturable absorption in the semiconductor material of the semiconductor saturable absorber, and thus to set the semiconductor saturable absorber to its transparent state.

When not illuminated by an optical sampling pulse, the semiconductor saturable absorber absorbs the optical signal-under-test. Each optical sampling pulse sets the semiconductor saturable absorber to its transparent state in which the semiconductor saturable absorber transmits an optical sample of the optical signal-under-test. A suitably-located a photodetector receives the optical samples and converts them into corresponding electrical samples. The electrical samples each represent a portion of the modulation waveform of the optical signal-under-test. The electrical signal is then integrated to generate an electrical signal that represents the modulation waveform of the optical signal-under-test. Measurements can then be performed on the electrical signal to determine the properties of the optical signal-under-test.

As noted above, the optical sampling pulses have a peak intensity greater than the intensity that induces saturable absorption in the semiconductor saturable absorber. The maximum duration of the optical sampling pulses is determined by the desired frequency response of the optical domain optical signal sampling device. Also as noted above, optical samples having a duration of about 2 ps provide the optical domain optical signal sampling device with a frequency response that extends to about 200 GHz. Because the semiconductor saturable absorber requires time to revert from its transparent state to its absorptive state at the end of each optical sampling pulse, the optical sampling pulses should be shorter than the desired duration of the optical samples.

Lasers are capable of generating optical sampling pulses with a high intensity and an extremely short duration. A short-pulse laser, such as a mode-locked fiber laser, is capable of generating optical pulses with such characteristics. Short-pulse lasers that are currently available on the market are capable of generating optical pulses a pulse width of 0.1 ps and a peak light output power of 10 kW.

At the end of each optical sampling pulse, the semiconductor saturable absorber returns to its absorptive state by quenching the carriers generated therein. For the optical samples to have a duration short enough to provide the optical domain optical signal sampling device with a frequency response that extends to over 200 GHz, the carrier lifetime of the semiconductor material of the semiconductor saturable absorber should be in the order of picoseconds.

The change in the absorption coefficient of the semiconductor saturable absorber caused by saturable absorption is greatest at an optical frequency near the absorption edge of the semiconductor material of the semiconductor saturable absorber. The wavelength range in which a large change in the absorption coefficient occurs is typically less than about 20 to 30 nm. This wavelength range is insufficient to enable the optical domain optical signal sampling device to sample optical signals-under-test in a wide range of wavelengths. For example, the optical signals in a single WDM transmission channel may have wavelengths in a wavelength range greater than 100 nm.

A semiconductor saturable absorber has the following relationship between its absorption coefficient a and the intensity I of light illuminating it:

$$a = a_0/(1 + I/I_s) + a_1$$

where $a_0$ is the absorption coefficient at an intensity well below that which induces saturable absorption in the semiconductor saturable absorber, $a_1$ is the saturable absorption coefficient, i.e., the absorption coefficient in the saturable absorption state, and $I_s$ is the threshold intensity that induces saturable absorption in the semiconductor saturable absorber. For a semiconductor saturable absorber that includes a semiconductor layer of bulk semiconductor material, the threshold intensity $I_s$ has a value of 4 kW/cm$^2$, whereas a semiconductor saturable absorber that includes a semiconductor layer having a multiple quantum well (MQW) structure, the threshold intensity has a value of about 600 W/cm$^2$.

The threshold intensity of a semiconductor saturable absorber that includes a semiconductor layer having a multiple quantum well structure is lower because of exciton absorption. An exciton is composed of an electron and a hole bound to one another by electrostatic attraction and behaves like a single particle. A considerable fraction of the absorption coefficient of such semiconductor saturable absorber is attributable to exciton absorption. If illuminating the semiconductor saturable absorber with light of a wavelength in the exciton absorption wavelength range generates carriers, the excitons can no longer be maintained, and, hence, no more absorption attributable to the excitons occurs. This occurs at a relatively low illumination intensity, so effective saturable absorption can be achieved at such relatively low illumination intensity. In semiconductor saturable absorbers that exhibit exciton absorption, the wavelength range in which a large change in the absorption coefficient occurs is about the same as that of a bulk semiconductor material.

Furthermore, in semiconductor saturable absorber that includes a semiconductor layer having a multiple quantum well structure, the quantum well structure eliminates the band degeneration of heavy and light holes, and the heavy hole band contributes to the optical absorption. The transition between the heavy hole band and the conduction band comprises two transitions: that of electrons having an up spin and that of electrons having a down spin. Light with left-handed circular polarization contributes to the transition of the up-spin electrons, while light having right-handed circular polarization contributes to the transition of the down-spin electrons. Linear polarization is a superposition of left- and right-handed circular polarizations, so linearly-polarized light will contribute to the transitions of electrons of both spins.

If a semiconductor saturable absorber that includes a semiconductor layer having a quantum well structure is illuminated with left-handed circular polarized light, then only the transition of the up-spin electrons will absorb this light. Since left-handed circular polarized light does not contribute to the transition of down-spin electrons, which transition is required to achieve absorption saturation and, hence transparency, the transition of the up-spin electrons alone will result in the semiconductor saturable absorber remaining absorptive.

When the semiconductor saturable absorber in the state just described is additionally illuminated with the optical signal-under-test, and the optical signal-under-test is linearly polarized, the semiconductor saturable absorber will transmit the left-handed circular polarization component of the optical signal-under-test and will absorb the right-handed circular polarization component of the optical signal-under-test. As a result, the semiconductor saturable absorber outputs the optical samples with a polarization different from the optical signal-under-test, i.e., left-handed circular polarization instead of linear polarization. Thus, a semiconductor saturable absorber that includes a semiconductor layer having a quantum well structure not only has efficient saturable absorption through exciton absorption, but can also change the polarization of the optical signal-under-test.

A number of exemplary embodiments of a semiconductor saturable absorber-based optical domain optical signal sampling device according to the invention will now be described with reference to FIGS. 2 and 5-8.

Figure 2:
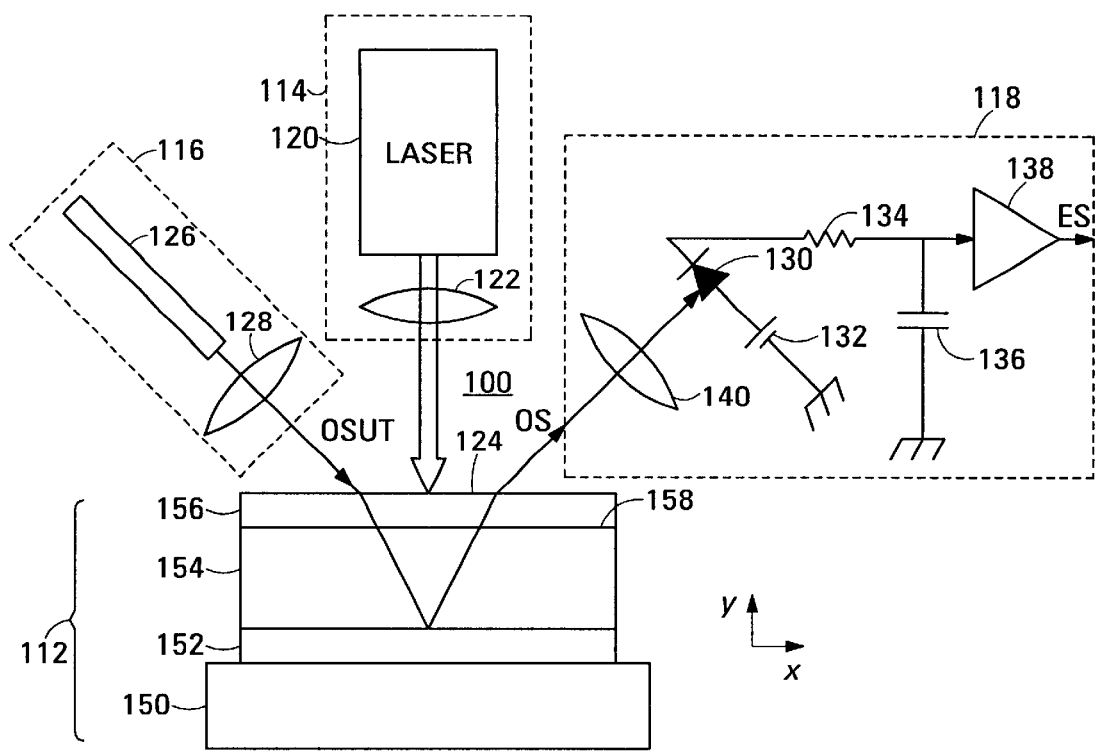
FIG. 2 is a simplified block diagram of a first embodiment of an optical domain optical signal sampling device according to the invention.

FIG. 2 is a block diagram of a first embodiment 100 of an semiconductor saturable absorber-based optical domain optical signal sampling device according to the invention in which the semiconductor saturable absorber includes a reflective layer and outputs the optical samples from the same major surface as that illuminated by the optical signal-under-test. The optical domain optical signal sampling device 100 includes the semiconductor saturable absorber 112, the optical sampling pulse source 114, the optical signal input 116 and the photodetector 118.

The optical sampling pulse source 114 is composed of the laser 120 and the converging element 122. The converging element 122 focuses the optical sampling pulses output by the laser on the major surface 124 of the semiconductor saturable absorber 112. The optical sampling pulse source is located relative to the semiconductor saturable absorber 112 to illuminate the major surface 124 with the optical sampling pulses generated by the laser.

The optical signal input 116 is composed of the optical fiber 126 and the converging element 128. The optical fiber carries the optical signal-under-test to the optical domain optical signal sampling device 100. The converging element 128 focuses the optical signal-under-test output by the optical fiber on the major surface 124 of the semiconductor saturable absorber 112. The optical signal input is located relative to the semiconductor saturable absorber 112 to illuminate the major surface 124 with the optical signal-under-test.

The photodetector 118 is composed of the photodiode 130, the DC bias supply 132, the resistor 134, the capacitor 136, the buffer amplifier 138 and the lens 140. The photodiode, the DC bias source and the resistor are connected in series to form a serial arrangement. The end of the serial arrangement provided by the negative terminal of the DC bias supply is connected to ground. The end of the serial arrangement provided by one end of the resistor is connected to the input of the buffer amplifier. The capacitor is connected in parallel with the serial arrangement between the input of the buffer amplifier and ground.

The optical sampling pulse source 114 and the optical signal input 116 are located relative to the semiconductor saturable absorber 112 so that the optical sampling pulses and the optical signal-under-test are incident on the major surface 124 of the semiconductor saturable absorber at different angles of incidence. In the example shown, the angle of incidence of the optical sampling pulses is substantially zero, where the angle of incidence is measured relative to the normal to the major surface, and the angle of incidence of the optical signal-under-test is greater than zero. The optical samples OS emerge from the semiconductor saturable absorber at an angle relative to the normal to the major surface substantially equal and opposite to the angle of incidence of the optical signal-under-test. As a result of the different angles of incidence, the optical samples are spatially and angularly separated from any reflection of the optical sampling pulses by the semiconductor saturable absorber. This enables the photodetector 118 to be oriented and located to receive only the optical samples OS output by the semiconductor saturable absorber without interference from reflections of the optical sampling pulses.

The photodetector 118 receives the optical samples OS output by the semiconductor saturable absorber 111. The lens 140 focuses the optical samples onto the photodiode 130. The photodiode generates an electrical pulse in response to each of the optical samples. The resistor 134 and the capacitor 136 integrate the electrical pulses to generate an electrical signal. The electrical signal is buffered by the buffer amplifier 138. The output of the buffer amplifier provides the electrical signal ES whose waveform represents the modulation waveform of the optical signal-under-test. Measurements may be performed on the electrical signal to determine the modulation waveform of the optical signal-under-test. In a digital sampling oscilloscope, output of the buffer amplifier is connected to the input of an analog-to-digital converter (not shown) that generates a digital representation of the electrical signal ES.

The semiconductor saturable absorber 112 is composed of the substrate 150, the reflective layer 152, the semiconductor layer 154 and the reflectivity control layer 156. The reflective layer, semiconductor layer and the reflection control layer are deposited, in order, on the substrate. Alternatively, the reflective layer and the reflection control layer may be deposited on the semiconductor layer, and the resulting sub-assembly may be attached to the substrate by a suitable adhesive.

The semiconductor layer 154 comprises a semiconductor material chosen to exhibit saturable absorption in a wavelength range that includes the wavelength of the optical signal-under-test. Additional desirable properties of the semiconductor layer will be described below.

The reflection control layer 156 comprises silicon nitride $Si_3N_4$ or a silicon oxide $SiO_x$. The thickness of the reflection control layer is set in relation to the refractive index of the semiconductor layer 154 to minimize reflection of the optical signal-under-test at the major surface 158 of the semiconductor layer. The reflection control layer may alternatively comprise multiple layers of dielectric or semiconductor materials with differing refractive indices and/or thicknesses.

The reflective layer 152 comprises a layer of gold. Alternatively, the reflective layer may comprise other reflective metals, such as aluminum or silver, or multiple layers of dielectric or semiconductor materials with differing refractive indices and/or thicknesses.

Operation of the optical switch 100 will now be described. In the absence of an optical sampling pulse from the optical sampling pulse source 114, the semiconductor layer 154 absorbs most of the optical signal-under-test, so the level of the electrical signal generated by the photodetector 118 is very low. The intensity of the optical signal-under-test is a small fraction of that of the optical sampling pulses, and is insufficient induce saturable absorption in the semiconductor saturable absorber.

The presence of an optical sampling pulse generated by the optical sampling pulse source 114 induces saturable absorption in the semiconductor layer 154 of the semiconductor saturable absorber 112. As a result, the absorption coefficient of the semiconductor layer is substantially reduced and the semiconductor layer becomes nearly transparent. In this state, the semiconductor layer absorbs substantially none of the optical signal-under-test as it transmits the optical signal-under-test to the reflective layer 152 and transmits the reflection of the optical signal-under-test back to its major surface 158. The resulting optical sample of the optical signal-under-test emerges from the reflectivity control layer 156 and passes to the photodetector 118. Since the semiconductor layer 154 transmits most of the optical signal-under-test, the level of the electrical signal ES is high.

In a first embodiment of the semiconductor layer 154, the semiconductor layer is a layer of a bulk semiconductor material, such as InGaAs. Other suitable materials for use as a bulk semiconductor layer 154 include InAlAs, AlGaAs, InAsP, GaInP, GaAsP, InAlGaAs, InAlGaAsSb, GaInAsP, GaAsSb, AlGaSb, and SiGeC. The optical absorption characteristics of an example of a bulk semiconductor layer 154 will be described below with reference to FIG. 3A.

In a second embodiment of the semiconductor layer 154, the semiconductor layer is a layer of a graded-composition semiconductor material, such as $In_xGa_{1-x}As$ in which the value of x changes with respect to the distance in the −y-direction from the major surface 158 of the semiconductor layer. The optical absorption characteristics of an example of a graded composition semiconductor layer 154 will be described below with reference to FIG. 3B.

In a third embodiment of the semiconductor layer 154, the semiconductor layer has a multiple quantum well (MQW) structure composed of at least one well layer sandwiched between a corresponding number of barrier layers. The well layer typically differs in thickness and semiconductor material from the barrier layers. In one embodiment, the materials of the well layer and the barrier layers were InGaAs and InAlAs, respectively. Alternative material pairs for the well layer and the barrier layers, respectively, include InAlGaAs and InAlGaAs, GaInAsP and GaInAsP, GaAsSb and InAlAs, AlGaSb and AlGaSb, InAlGaAsSb and InAlGaAsSb, SiGeC and SiGeC, SiGeC and AlGaAs, and SiGeC and InAlAs.

Figure 3A:
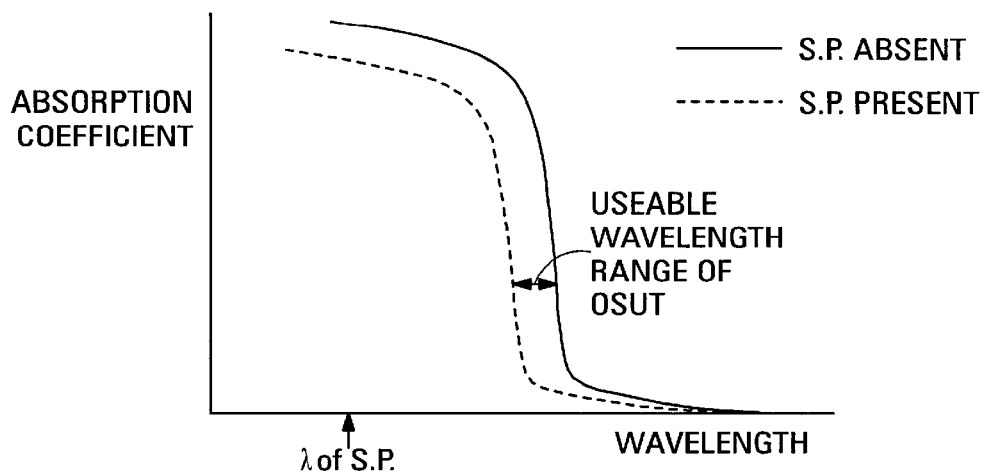
FIG. 3A is a graph showing the optical absorption versus wavelength characteristic of a semiconductor saturable absorber including bulk semiconductor material with a uniform composition.
Figure 3B:
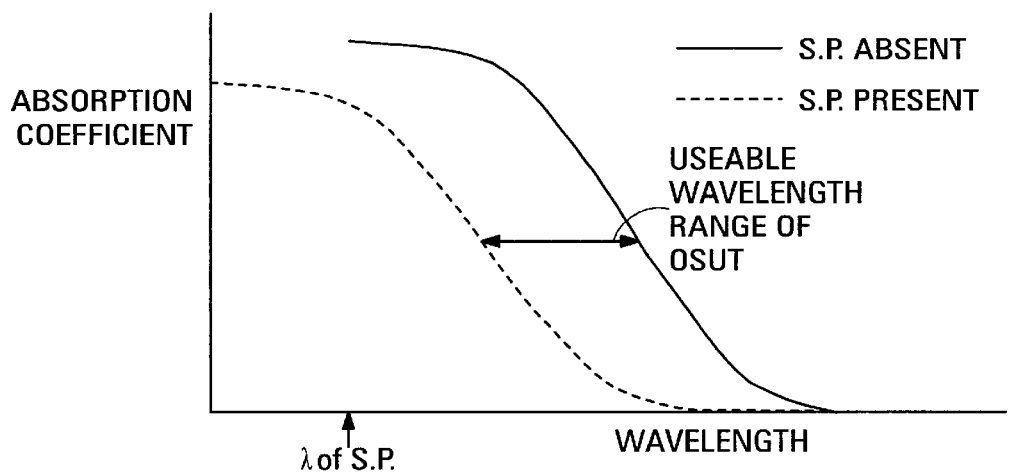
FIG. 3B is a graph showing the optical absorption versus wavelength characteristic of a semiconductor saturable absorber including a layer of graded-composition semiconductor material.

FIG. 3A is a graph showing the optical absorption versus wavelength characteristic of an example the semiconductor saturable absorber 112 in which the semiconductor layer 154 was a layer of bulk semiconductor material with a uniform composition. FIG. 3B is a graph showing the optical absorption versus wavelength characteristic of an example the semiconductor saturable absorber in which the semiconductor layer was a layer of graded-composition semiconductor material. In the example shown in FIG. 3B, the composition of the semiconductor material of the semiconductor layer was graded to provide the semiconductor material with a band gap that progressively decreased in the −y-direction from a maximum at the major surface 158. Each of FIGS. 3A and 3B includes two optical absorption characteristics, one measured in the absence of an optical sampling pulse and labelled S.P. absent, and one measured in the presence of an optical sampling pulse and labelled S.P. present.

When the semiconductor saturable absorber 112 includes a semiconductor layer 154 composed of a semiconductor material with the band gap characteristics just described, the wavelength of the optical sampling pulses is set to be shorter than the wavelength at the band edge. This ensures that sufficient absorption will occur even in the portion of the semiconductor material having the largest band gap. Using such materials permits saturable absorption-based sampling to be performed on optical signals-under-test covering a wide range of wavelengths, as occurs in WDM applications in particular. The wavelength of the sampling pulses is indicated by λ of S.P. in FIGS. 3A and 3B.

Comparing FIGS. 3A and 3B shows that the optical absorption curve is less steep when the semiconductor layer 154 is composed of graded-composition semiconductor material. When the semiconductor layer is composed of bulk semiconductor material, as shown in FIG. 3A, the optical domain optical signal sampling device 100 is capable of sampling the optical signal-under-test (OSUT) over a relatively narrow wavelength range. This wavelength range is about 30 nm in the example shown. When the semiconductor layer is composed of a graded-composition semiconductor material, as in FIG. 3B, the optical domain optical signal sampling device 100 is capable of sampling the optical signal-under-test over a relatively wide wavelength range. This wavelength range is about 200 nm in the example shown. Therefore, when the optical domain optical signal sampling device 100 is required to measure the modulation waveform over a relatively wide range of optical wavelengths, such as in WDM applications, the semiconductor layer 154 should include semiconductor materials having different band gaps. A graded-composition semiconductor material includes such semiconductor materials.

The wide wavelength range shown in FIG. 3B cannot be obtained when the semiconductor layer is composed of a conventional, high-quality, single-crystal, graded-composition semiconductor material. A semiconductor layer composed of conventional, high-quality, single-crystal, graded composition semiconductor material is grown at a growth temperature greater than about 500° C., and even greater than about 600° C. In a semiconductor layer of high-quality, single-crystal, graded-composition semiconductor material, carriers generated in the wide band-gap semiconductor material region of the semiconductor layer do not accumulate there. Such carriers move into, and accumulate in, the narrow band-gap semiconductor material region of the semiconductor layer. The carriers move through diffusion or through drift caused by the built-in potential gradient resulting from the composition gradation. As a result, the wavelength range in which saturable absorption can be induced is narrow, just as in a semiconductor layer composed of bulk semiconductor material having a uniform composition.

Accordingly, in embodiments of the invention that sample optical signals having more than a narrow wavelength range, the semiconductor layer 154 is composed of semiconductor material having a short carrier lifetime. Semiconductor material having a short carrier lifetime has numerous defects in its crystalline structure. Such semiconductor material may be single-crystal material or polycrystalline material. In a semiconductor layer of semiconductor material having a short carrier lifetime, the carriers have a short lifetime and a low mobility so that carrier migration is substantially reduced. Consequently, the carriers remain more or less in the region where they were generated, so that, when the semiconductor layer is a graded-composition layer, saturable absorption is induced in a wavelength range corresponding to the band gap of the semiconductor material located where the light was absorbed.

Semiconductor material having a short carrier lifetime may be formed in a number of ways. Ions may be implanted into single-crystal semiconductor material to cause numerous defects in the crystal structure. Alternatively, so-called low-temperature-deposited semiconductor material has a short carrier lifetime. Low-temperature-deposited semiconductor material is deposited at a deposition temperature below that at which single-crystal growth takes place. A deposition temperature below about 300° C. will produce low-temperature-deposited semiconductor material having a crystal structure with numerous defects, and, consequently, a short carrier lifetime. Saturable absorption can be induced over a wide range of wavelengths in graded-composition semiconductor materials having a short carrier lifetime.

In a practical embodiment of a semiconductor layer 154 of graded-composition semiconductor material having a short carrier lifetime, the semiconductor material of the semiconductor layer was $(Al_xGa_{1-x})_{0.47}In_{0.53}As$ in which x was progressively increased as the layer was deposited. The initial value of x was zero and the maximum value was 0.13 achieved at the end of the deposition process. Thus, in this example of semiconductor layer 154, the value of x progressively decreases in the −y-direction from a maximum of 0.13 at the major surface 158. The deposition was performed at a deposition below about 300° C. The defect density of the semiconductor material having the short carrier lifetime was about $1–10^{18}$ cm$^{-3}$. A semiconductor saturable absorber incorporating the semiconductor layer just described exhibited saturable absorption in a wavelength range extending from 1.50 μm to 1.65 μm.

A semiconductor layer 154 in which the band gap of the semiconductor material decreases with depth from its major surface 158 can be made not only by depositing the semiconductor layer as a graded-composition layer, but also by depositing more than one sub-layer to form the layer. Each sub-layer is composed of a bulk semiconductor material having a band gap different from that of the other sub-layers. The composition of the material of each sub-layer may be uniform.

In an embodiment of the semiconductor layer 154 having a multiple quantum well structure, the wavelength range over which saturable absorption can be induced may be increased by a graded MQW structure in which the well layers of the quantum wells differ from one another in either or both of composition or thickness.

Figure 4:
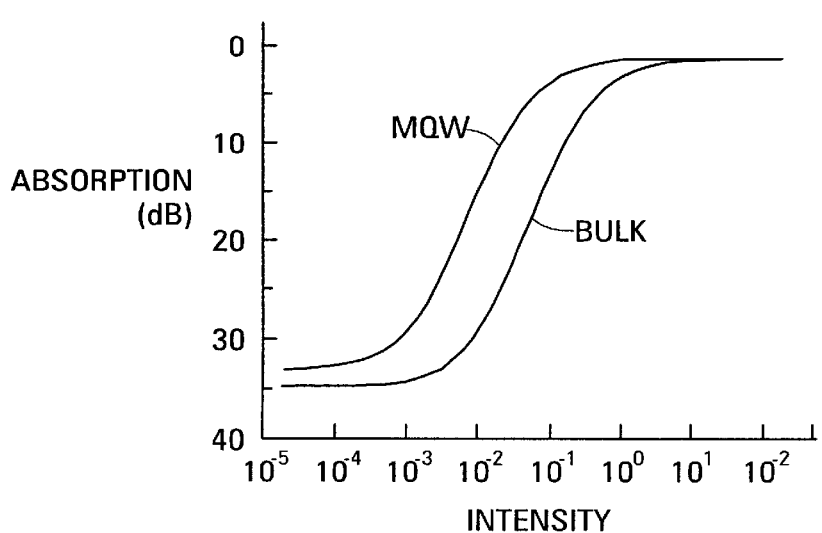
FIG. 4 is a graph showing the optical absorption versus intensity characteristic of semiconductor saturable absorbers including bulk semiconductor material with a uniform composition and including a multiple quantum well structure.

FIG. 4 is a graph showing how the absorption of light by the semiconductor layer 154 varies in response to the intensity of the light. Two examples of the semiconductor layer are shown, namely, a semiconductor layer of bulk semiconductor material and a semiconductor layer having an MQW structure. The semiconductor layer is strongly absorbent when the intensity is low, but the absorption decreases sharply at the threshold intensity $I_s$. The threshold intensity is significantly lower when the semiconductor layer has an MQW structure.

The intensity of the optical signal-under-test is typically on the order of about 10 W/cm$^2$. Since the absorption of light by the semiconductor layer is substantially independent of intensity at this intensity, the semiconductor layer 154 absorbs substantially all of the optical signal-under-test. On the other hand, a practical embodiment of the optical sampling pulse source 114 generates the optical sampling pulses with a peak intensity on the order of 1 GW/cm$^2$. This intensity is sufficient to induce saturable absorption in the semiconductor saturable absorber 112. In this state, the absorption coefficient of the semiconductor layer is significantly reduced, and the semiconductor layer becomes nearly transparent. As a result, the portions of the optical signal-under-test that are incident on the semiconductor layer simultaneously with the optical sampling pulses will reach the photodetector after being transmitted through the semiconductor layer. In the embodiment shown in FIG. 2, the optical signal-under-test is additionally reflected by the reflection layer 152 during transmission through the semiconductor layer. It can be seen from FIG. 4 that sampling can be performed with optical sampling pulses having a lower peak intensity when the semiconductor layer has an MQW structure.

A mode-locked fiber laser, a gain-switch laser, or similar lasers can be used as the laser 120. Lasers with a pulse width and a peak light output power of about 0.1 ps and 10 kW, respectively, are already available on the market.

Any electro-optical device capable of detecting light, such as a PIN diode, an avalanche photodiode, or a photoconductive element, can be used as the photodiode 130. The response speed of the photodiode needs to be no higher than the maximum modulation frequency of the optical signal-under-test.

In exemplary embodiments, the semiconductor layer 154 was composed of low-temperature-deposited or ion-implanted InGaAs, or included quantum wells formed of low-temperature-deposited InGaAs and InAlAs. Such materials are suitable for sampling optical signals-under-test in a wavelength range centered on 1.55 μm. Other semiconductor materials conventionally used for high-speed detection of light in this wavelength range may alternatively be used. Other materials may be required for other wavelength ranges. The semiconductor layer 154 had a total thickness in the range from 2–4 μm.

In an exemplary embodiment of the semiconductor layer 154 having a MQW structure, the number of well layers was in the range from 50–200, the material of the well layers was low-temperature-deposited $In_{0.53}Ga_{0.47}As$ and the material of the barrier layers was low-temperature-deposited $In_{0.53}Al_{0.47}$. The thickness of the well layers was in the range from 6–8nm and that of the barrier layers was about 10nm. In one embodiment, the number of well layers was 100, and the number of barrier layers was 101.

In an exemplary embodiment of the semiconductor layer 154 having a graded MQW structure, the thickness of the well layers was progressively changed from about 4 nm to about 14 nm, while the thickness of the barrier layers was kept constant.

The reflective layer 152 was composed of a layer of gold and a buffer layer of titanium sandwiched between the gold layer and the semiconductor layer 154. The gold layer had a thickness in the range from 50–500 nm and the buffer layer had a thickness of several nanometers. The reflection control layer 156 was a layer of silicon dioxide or silicon nitride having a thickness of about 200 nm. The substrate 150 was a copper to which the reflecting layer 152 was soldered. Using a material with a high thermal conductivity as the substrate and attaching the reflecting layer to the substrate by a solder or some other thermally-conductive adhesive enables the substrate to serve as a heat sink. Alternative substrate materials include aluminum nitride and silicon. As a further alternative, the reflection control layer may be integral with the substrate.

Figure 5:
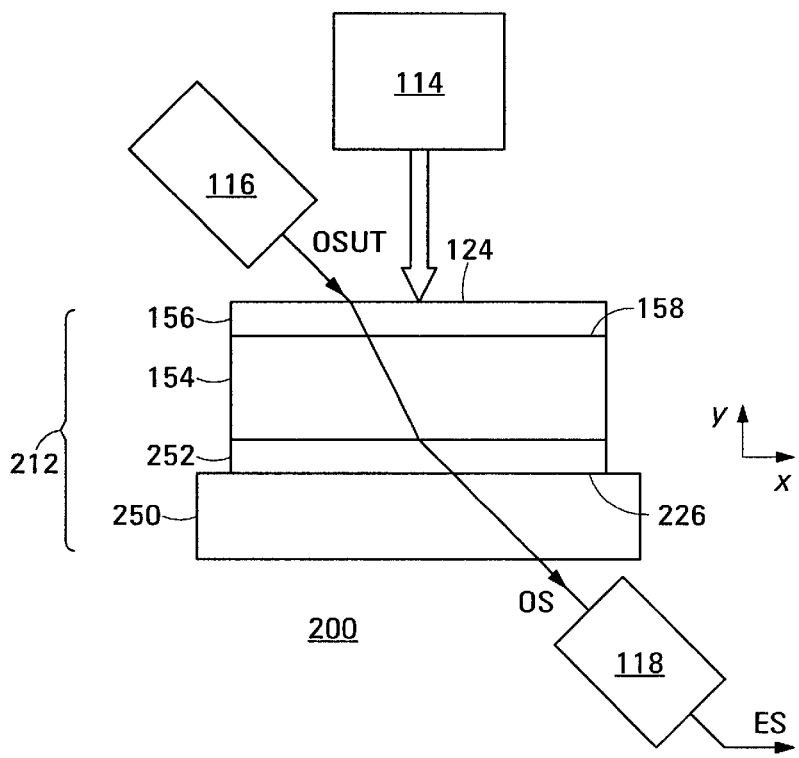
FIG. 5 is a simplified block diagram of a second embodiment of an optical domain optical signal sampling device according to the invention.

FIG. 5 is a block diagram showing a second embodiment 200 of an optical domain optical signal sampling device according to the invention in which the semiconductor saturable absorber outputs the optical samples from the major surface opposite the major surface illuminated by the optical signal-under-test. Elements of the optical domain optical signal sampling device 200 that correspond to elements of the optical domain optical signal sampling device 100 described above with reference to FIG. 2 are indicated using the same reference numerals and will not be described again here. Moreover, details of the optical sampling pulse source 114, the optical signal input 116 and the photodetector 118 are omitted to simplify the drawing.

In the optical domain optical signal sampling device 200, the semiconductor saturable absorber 212 is composed of the transparent substrate 250, the reflection control layer 252, the semiconductor layer 154 and the reflection control layer 156. The photodetector is re-located to receive the optical samples output from the major surface 226 of the semiconductor saturable absorber opposite the major surface 124 illuminated by the optical signal-under-test. The optical samples OS emerge from the semiconductor saturable absorber spatially and angularly separated from the optical sampling pulses transmitted through the semiconductor saturable absorber, and can therefore be detected by the photodetector without interference from the transmitted optical sampling pulses.

The reflection control layer 252 is similar to the reflection control layer 156 but is structured to reduce reflection at the surface between the semiconductor saturable absorber and the substrate. Since the substrate has a refractive index different from that of air, either or both of the thickness and material of the reflection control layer 252 differs from that of the reflection control layer 156.

The material of the substrate 250 is transparent in the wavelength range of the optical signal-under-test.

Operation of the optical domain optical signal sampling device 200 will now be described. In the absence of an optical sampling pulse from the optical sampling pulse source 114, the semiconductor layer 154 of the semiconductor saturable absorber 212 absorbs most of the optical signal-under-test, so the level of the electrical signal ES generated by the photodetector 118 is very low. The intensity of the optical signal-under-test is a small fraction of that of the optical sampling pulses, and is insufficient to induce saturable absorption in the semiconductor saturable absorber.

The presence of an optical sampling pulse generated by the optical sampling pulse source 114 induces saturable absorption in the semiconductor layer 154 of the semiconductor saturable absorber 212. As a result, the absorption coefficient of the semiconductor layer is substantially reduced and the semiconductor layer becomes nearly transparent. In this state, the semiconductor saturable absorber absorbs substantially none of the optical signal-under-test as it transmits the optical signal-under-test. The resulting optical sample of the optical signal-under-test emerges from the reflectivity control layer 252 and passes through the transparent substrate 250 to the photodetector 118. Since the semiconductor layer transmits most of the optical signal-under-test, the level of the electrical signal ES is high.

In exemplary embodiments, the semiconductor layer 154 and the reflection control layer 156 were as described above. The reflection control layer 252 was similar to the reflection control layer 156. The substrate 250 was a plate of a glass having a high transmissivity in the wavelength range of the optical signal-under-test.

In the optical domain optical signal sampling devices 100 and 200, the spatial and angular separation between the optical samples output by the semiconductor saturable absorber and the optical sampling pulses exiting the semiconductor saturable absorber significantly reduces the intensity of stray light originating from the optical sampling pulses that reaches the photodetector 118. Such stray light contributes noise to the electrical signal generated by the photodetector. The intensity ratio between the optical sampling pulses and the optical samples is large, so that even a small fraction of the intensity of the optical sampling pulses reaching the photodetector as stray light may undesirably impair the signal-to-noise ratio of the electrical signal.

In addition, the signal-to-noise ratio of the electrical signal can be impaired if the semiconductor saturable absorber absorbs less than all of the optical signal-under-test when it is not illuminated by the optical sampling pulses.

The three embodiments of the optical domain optical signal sampling device to be described next with reference to FIGS. 6–8 include structural elements that increase the signal-to-noise ratio of the electrical signal generated by the photodetector 118 by attenuating unwanted light ahead of the photodetector.

Figure 6:
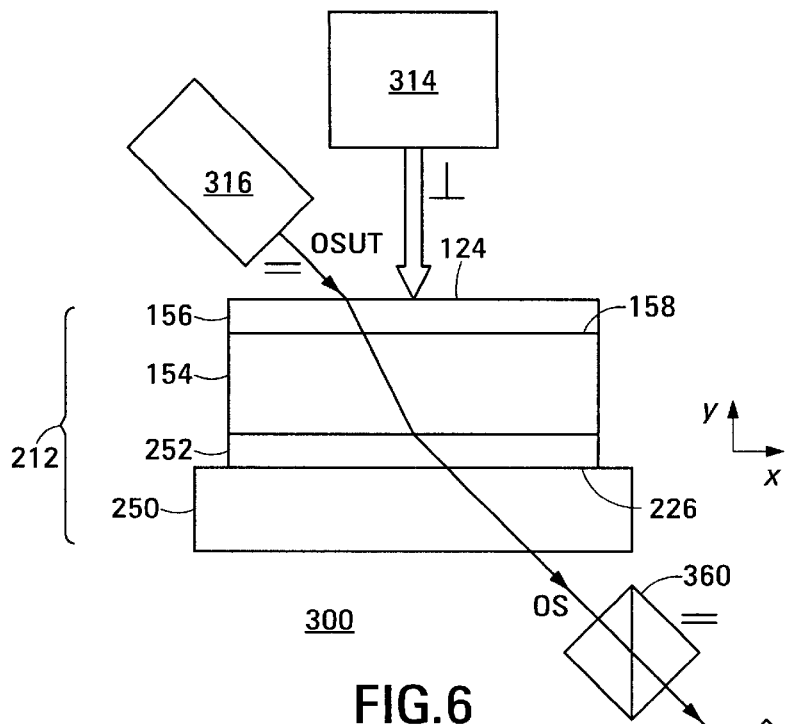
FIG. 6 is a simplified block diagram of a third embodiment of an optical domain optical signal sampling device according to the invention.

FIG. 6 shows a third embodiment 300 of an optical domain optical signal sampling device according to the invention in which the optical sampling pulses and the optical signal-under-test are each linearly polarized and have orthogonal directions of polarization, and a polarization analyzer is located between the semiconductor saturable absorber and the photodetector. The orthogonal directions of polarization and the polarization analyzer attenuate stray light originating from the optical sampling pulses ahead of the photodetector and increase the dynamic range of the electrical signal ES generated by the photodetector. Elements of the optical domain optical signal sampling device 300 that correspond to elements of the optical domain optical signal sampling devices described above with reference to FIGS. 2 and 5 are indicated using the same reference numerals and will not be described again here. Moreover, structural details of the optical sampling pulse source 314, the optical signal input 316 and the photodetector 118 are omitted to simplify the drawing.

In the optical domain optical signal sampling device 300, the optical sampling pulse source 314 and the optical signal input 316 are similar to the optical sampling pulse source 114 and the optical signal input 116 described above with reference to FIG. 2. However, the optical sampling pulse source 314 generates the optical sampling pulses with linear polarization and the optical signal input 316 emits the optical signal-under-test with linear polarization. The optical sampling pulse source and the optical signal input are arranged to set the directions of polarization of the optical sampling pulses and the optical signal-under-test mutually orthogonal to one another.

The optical signal-under-test received by the optical domain optical signal sampling device 300 may be linearly polarized, in which case, the optical signal input 316 is identical to the optical signal input 116 described above. Alternatively, the optical signal-under-test may be unpolarized. In this case, the optical signal input 316 is similar to the optical signal input 116 described above and additionally includes a polarizer that linearly polarizes the optical signal-under-test.

The optical domain optical signal sampling device 300 additionally includes the polarization analyzer 360 located in the optical path of the optical samples OS between the semiconductor saturable absorber 212 and the photodetector 118. The polarization analyzer is aligned with its polarization direction of maximum transmission parallel to the direction of polarization of the optical signal-under-test output by the optical signal input 316. The polarization analyzer therefore has its polarization direction of minimum transmission parallel to the direction of polarization of the optical sampling pulses output by the optical sampling pulse source 314. The polarization analyzer is a polarizing beam splitter in the example shown, but other polarization analyzers are known in the art and may alternatively be used.

Aligned as just described, the transmissivity of the polarization analyzer 360 is a maximum with respect to the optical samples OS output by the semiconductor saturable absorber 212 and is a minimum with respect to stray light originating from the optical sampling pulses. Thus, the polarization analyzer significantly reduces the intensity of the stray light originating from the optical sampling pulses that reaches the photodetector 118. The linearly-polarized optical signal-under-test and optical sampling pulses together with the polarization analyzer 360 collectively reduce the ability of the stray light originating from the optical sampling pulses to introduce noise into the electrical signal ES generated by the photodetector.

Figure 7:
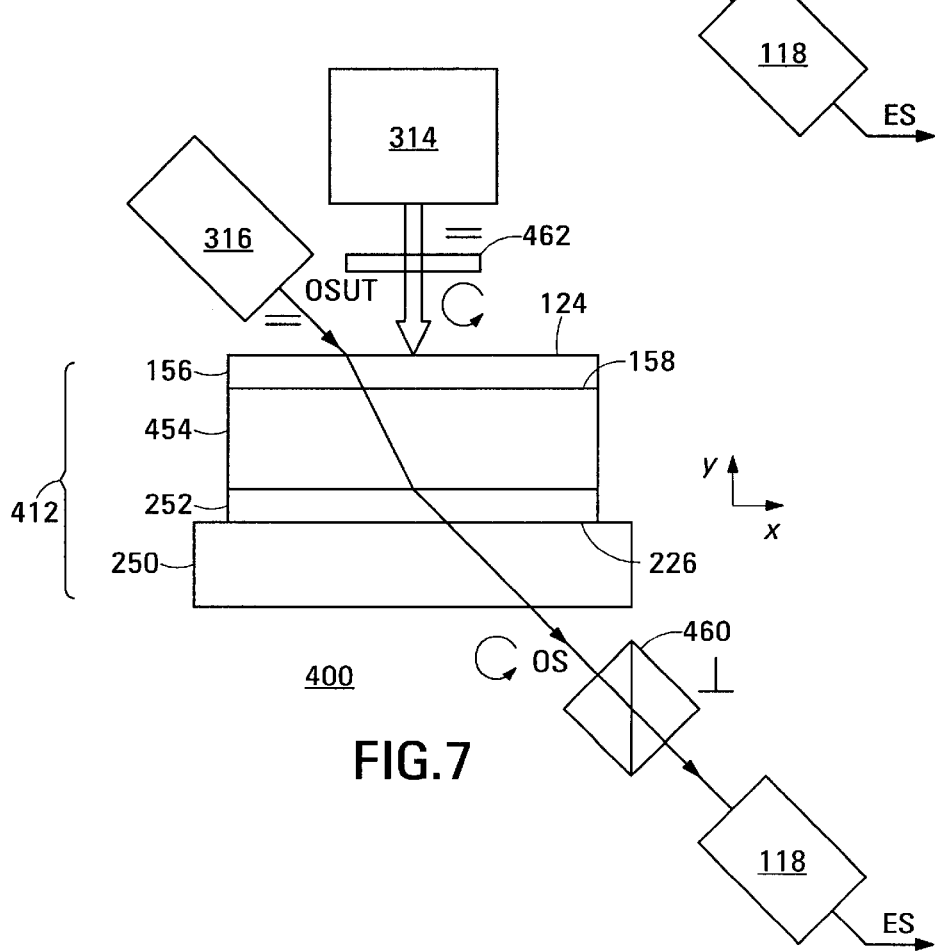
FIG. 7 is a simplified block diagram of a fourth embodiment of an optical domain optical signal sampling device according to the invention.
Figure 8:
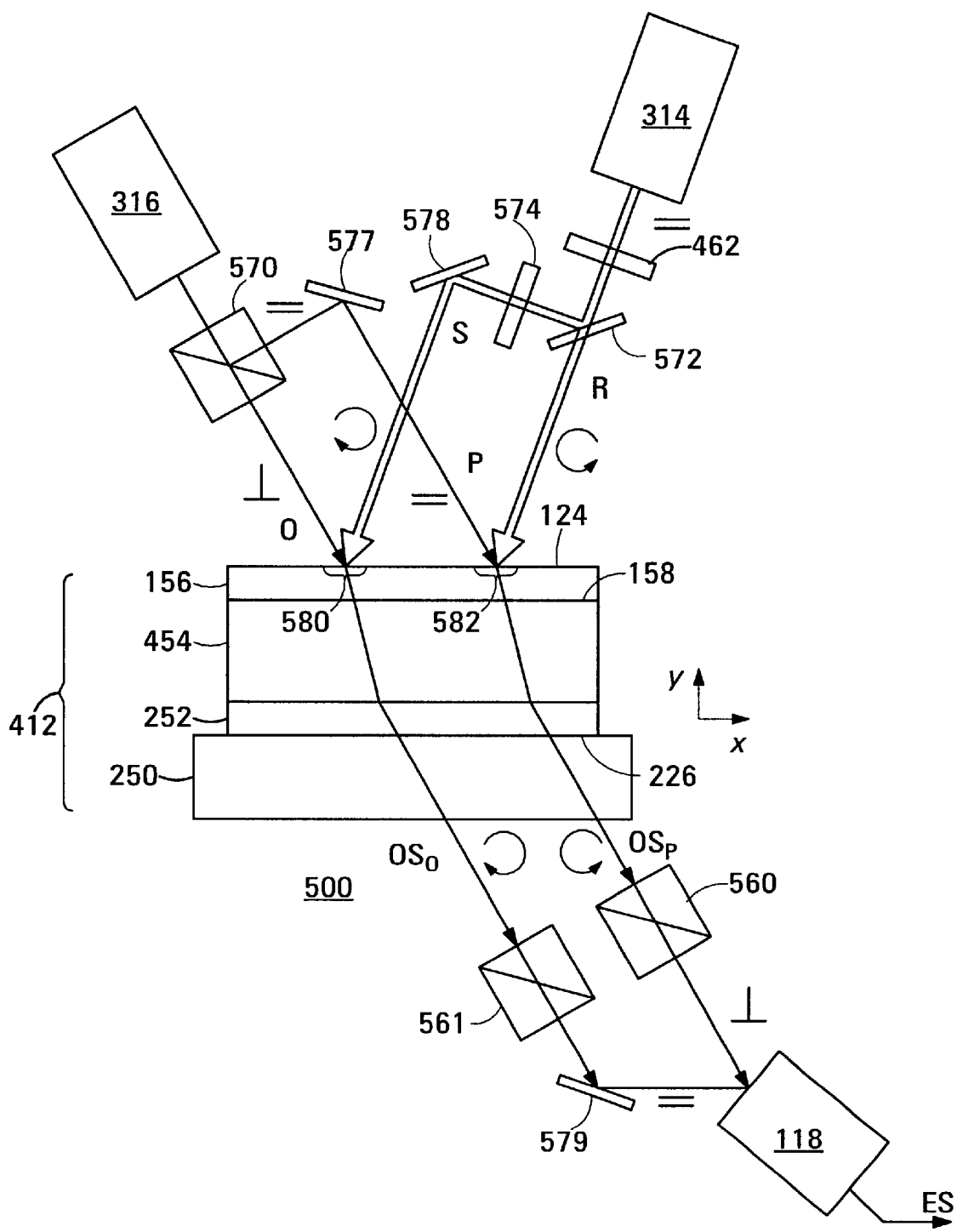
FIG. 8 is a simplified block diagram of a fifth embodiment of an optical domain optical signal sampling device according to the invention.

FIG. 7 is a schematic diagram of a fourth embodiment 400 of an optical domain optical signal sampling device according to the invention in which the optical sampling pulses are circularly polarized, the optical signal-under-test is linearly polarized, the semiconductor layer of the semiconductor saturable absorber has a quantum well structure and a polarization analyzer is located between the semiconductor saturable absorber and the photodetector. The quantum well structure of the semiconductor layer causes changes in polarization that, together with the differing polarizations of the optical sampling pulses and the optical signal-under-test and the polarization analyzer, attenuate any unabsorbed portion of the optical signal-under-test output by the semiconductor saturable absorber when the semiconductor saturable absorber is not illuminated by the optical sampling pulses. This increases the signal-to-noise ratio of the electrical signal ES generated by the photodetector. Elements of the optical domain optical signal sampling device 400 that correspond to elements of the optical domain optical signal sampling devices described above with reference to FIGS. 2, 5 and 6 are indicated using the same reference numerals and will not be described again here. Again, structural details of the optical sampling pulse source 314, the optical signal input 316 and the photodetector 118 are omitted to simplify the drawing.

The optical domain optical signal sampling device 400 includes the optical sampling pulse source 314, the optical signal input 316, the photodetector 118, the semiconductor saturable absorber 412, the polarization analyzer 460 and the quarter-wave plate 462. The quarter-wave plate is located in the optical path of the optical sampling pulses between the optical sampling pulse source 314 and the semiconductor saturable absorber 412. The polarization analyzer 460 is located in the optical path of the optical samples OS between the semiconductor saturable absorber 412 and the photodetector, described above. The polarization analyzer is aligned with its polarization direction of maximum transmission orthogonal to the direction of polarization of the optical signal-under-test output by the optical signal input 316.

The semiconductor saturable absorber 412 is substantially similar to the semiconductor saturable absorber 212 described above with reference to FIG. 5, except that the semiconductor layer 454 has a multiple quantum well structure comprising at least one well layer and a corresponding number of barrier layers. The quantum well structure of the semiconductor layer eliminates the band degeneration of heavy and light holes in the valence band, and the heavy hole band contributes to optical absorption. The transition between the heavy hole band and the conduction band comprises two transitions: that of electrons having an up spin and that of electrons having a down spin. Light with left-handed circular polarization contributes to the transition of the up-spin electrons, while light having right-handed circular polarization contributes to the transition of the down-spin electrons. Linear polarization is a superposition of left- and right-handed circular polarizations, so linearly-polarized light will contribute to the transitions of the electrons of both spins.

The optical sampling pulse generator 314 generates the optical sampling pulses with linear polarization. The quarter-wave plate 462 converts the linear polarization of the optical sampling pulses to left-handed circular polarization. In the semiconductor layer 454, the optical sampling pulses with left-handed circular polarization are absorbed only by the up-spin electron transitions since such optical sampling pulses are not absorbed by the down-spin electron transitions. Absorption of the optical sampling pulses by the up-spin electron transitions results in the semiconductor saturable absorber remaining absorptive.

The optical signal input 316 outputs the optical signal-under-test with a linear polarization. When the linearly-polarized optical signal-under-test is incident on the semiconductor saturable absorber 412 in the state just described, the semiconductor saturable absorber transmits the left-handed circular polarization component of the optical signal-under-test as an optical sample, and absorbs the right-handed circular polarization component of the optical signal-under-test. Therefore, each time the semiconductor saturable absorber is illuminated by an optical sampling pulse, it transmits an optical sample of the optical signal-under-test. However, the optical sample is left-handed circular polarized, and does not have the linear polarization of the optical signal-under-test.

The optical samples output by the semiconductor saturable absorber 412 pass to the polarization analyzer 460, which has its polarization direction of maximum transmission orthogonal to the direction of polarization of the optical signal-under-test. The optical samples, being circularly polarized, pass through the polarization analyzer to the photodetector 118. However, when the semiconductor saturable absorber 412 is not illuminated by the optical sampling pulses, it does not change the polarization of the residual of optical signal-under-test. The residual of the optical signal-under-test is therefore linearly polarized in the direction orthogonal to the direction of maximum transmission of the polarization analyzer. The polarization analyzer significantly attenuates the residual of the optical signal-under-test reaching the photodetector 118, and therefore increases the signal-to-noise ratio of the electrical signal ES generated by the photodetector.

Light that has passed through an optical fiber may be polarized, but its direction of polarization is often indeterminate. FIG. 8 is a schematic diagram of a fifth embodiment 500 of an optical domain optical signal sampling device according to the invention suitable for use in applications in which the direction of polarization of the optical signal-under-test is indeterminate. The optical signal-under-test is separated into polarization components having orthogonal directions of polarization, and each component is sampled independently. Elements of the optical domain optical signal sampling device 500 that correspond to elements of the optical domain optical signal sampling devices described above with reference to FIGS. 2, 5, 6 and 7 are indicated using the same reference numerals and will not be described again here. Again, structural details of the optical sampling pulse source 314, the optical signal input 316 and the photodetector 118 are omitted to simplify the drawing.

The optical domain optical signal sampling device 500 includes the optical sampling pulse source 314, the optical signal input 316, the photodetector 118, the semiconductor saturable absorber 412, the polarization analyzers 560 and 561, the quarter-wave plate 462, the polarizing beam splitter 570, the non-polarizing beam splitter 572, the half-wave plate 574 and the mirrors 577, 578 and 579.

The polarizing beam splitter 570 is located in the output optical path of the optical signal input 316 and divides the optical signal-under-test into two polarization components O and P having orthogonal directions of polarization. The polarization component O passes through the polarizing beam splitter and illuminates the region 580 on the major surface 124 of the semiconductor saturable absorber 412. The polarizing beam splitter directs the polarization component P along an optical path orthogonal to that of the polarization component O. The mirror 577 is located in this optical path, and re-directs the polarization component P to illuminate the region 582 on the major surface of the semiconductor saturable absorber.

The quarter-wave plate 462 and the non-polarizing beam splitter 572 are located in the output optical path of the sampling pulse generator 314. The optical sampling pulse generator 314 generates the optical sampling pulses with a linear polarization. The quarter-wave plate 462 converts the linear polarization of the optical sampling pulses to left-handed circular polarization. The non-polarizing beam splitter divides the optical sampling pulses in two sampling pulse components R and S. both having left-handed circular polarization and of substantially equal intensity.

The sampling pulse component R passes through the non-polarizing beam splitter 572 and illuminates the region 582 on the major surface 124 of the semiconductor saturable absorber 412. The non-polarizing beam splitter directs the sampling pulse components S along an optical path orthogonal to that of the sampling pulse components R. The half-wave plate 574 and the mirror 578 are located in this path. The half-wave plate converts the left-handed circular polarization of the sampling pulse components S to right-handed circular polarization, and the mirror 578 re-directs the sampling pulse components S to illuminate the region 580 on the major surface of the semiconductor saturable absorber.

The polarization analyzer 560 is located in the optical path of the optical samples $OS_P$ derived from the polarization component P. This optical path extends from the semiconductor saturable absorber 412 to the photodetector 118. The polarization analyzer is aligned with its polarization direction of maximum transmission orthogonal to the direction of polarization of the polarization component P output by the polarizing beam splitter 570.

The polarization analyzer 561 and the mirror 579 are located in the optical path of the optical samples $OS_O$ derived from the polarization component O. This optical path extends from the semiconductor saturable absorber 412 to the photodetector 118. The polarization analyzer is aligned with its polarization direction of maximum transmission orthogonal to the direction of polarization of the polarization component O output by the polarizing beam splitter 570. The mirror 579 re-directs the optical samples output by the polarization analyzer 561 to the photodetector 118. Thus, the optical samples derived from both of the polarization components O and P are incident on the photodetector 118.

With respect to each of the polarization components P and O derived from the optical signal-under-test and with respect to the respective sampling pulse components R and S derived from the optical sampling pulses, the operation of the optical domain optical signal sampling device 500 is the same as that of the optical domain optical signal sampling device 400 described above with reference to FIG. 7. Thus, the electrical signal output by the photodetector 118 is generated in response to both polarization components derived from the optical signal-under-test, and is therefore independent of the polarization of the optical signal-under-test. Moreover, the polarization analyzers 560 and 561 significantly attenuate the residual of the optical signal-under-test output by the semiconductor saturable absorber 412 when the semiconductor saturable absorber is not illuminated by the sampling pulse components. Thus, the level of the residual of the optical signal-under-test detected by the photodetector is very low and the signal-to-noise ratio of the electrical signal ES is high.

This disclosure describes the invention in detail using illustrative embodiments. However, it is to be understood that the invention defined by the appended claims is not limited to the precise embodiments described.

I claim:

1. An optical domain optical signal sampling device for sampling an optical signal-under-test, the optical domain optical signal sampling device comprising:

a semiconductor saturable absorber;

an optical sampling pulse source arranged to illuminate the semiconductor saturable absorber with optical sampling pulses;

an optical signal input arranged to illuminate the semiconductor saturable absorber with the optical signal-under-test; and a light detector arranged to receive optical samples of the optical signal-under-test output by the semiconductor saturable absorber in response to the optical sampling pulses.

2. The optical domain optical signal sampling device of claim 1, in which:

the optical sampling pulse source includes a laser that generates pulses of light having a pulse width of no more than 10 ps; and the semiconductor saturable absorber includes a semiconductor material with a carrier lifetime of no more than 10 ps.

3. The optical domain optical signal sampling device of claim 1, in which the semiconductor saturable absorber includes a semiconductor layer comprising semiconductor material having a short carrier lifetime.

4. The optical domain optical signal sampling device of claim 3, in which the semiconductor material having the short carrier lifetime includes low-temperature-deposited semiconductor material.

5. The optical domain optical signal sampling device of claim 3, in which the semiconductor material having the short carrier lifetime includes ion-implanted semiconductor material.

6. The optical domain optical signal sampling device of claim 1, in which the semiconductor saturable absorber includes a semiconductor layer comprising at least one semiconductor material selected from the group consisting of: InGaAs, InAlAs, AlGaAs, InAsP, GaInP, GaAsP, InAlGaAs, InAlGaAsSb, GaInAsP, GaAsSb, AlGaSb, and SiGeC.

7. The optical domain optical signal sampling device of claim 1, in which the semiconductor saturable absorber includes a semiconductor layer comprising graded-composition semiconductor material.

8. The optical domain optical signal sampling device of claim 7, in which:

the graded-composition semiconductor material has a band gap and a direction of composition gradation; and the band gap of the graded-composition semiconductor material progressively changes in the direction of the composition gradation.

9. The optical domain optical signal sampling device of claim 1, in which the semiconductor saturable absorber includes a semiconductor layer including a quantum well structure comprising at least one well layer and a corresponding number of barrier layers.

10. The optical domain optical signal sampling device of claim 9, in which:
   the quantum well structure includes well layers; and
   at least two of the well layers differ from one another in at least one of (a) thickness and (b) band gap.

11. The optical domain optical signal sampling device of claim 8, in which the well layer and the barrier layers comprise semiconductor materials respectively selected from a group consisting of: InGaAs and InAlAs, InAlGaAs and InAlGaAs, GaInAsP and GaInAsP, GaAsSb and InAlAs, AlGaSb and AlGaSb, InAlGaAsSb and InAlGaAsSb, SiGeC and SiGeC, SiGeC and AlGaAs, and SiGeC and InAlGaAs.

12. The optical domain optical signal sampling device of claim 1, in which the light detector is arranged to receive the optical samples of the optical signal-under-test transmitted through the semiconductor saturable absorber.

13. The optical domain optical signal sampling device of claim 1, in which:
   the semiconductor saturable absorber includes a reflective layer; and
   the light detector is arranged to receive the optical samples of the optical signal-under-test reflected through the semiconductor saturable absorber by the reflective layer.

14. The optical domain optical signal sampling device of claim 1, in which:
   the light detector generates an electrical signal in response to the optical samples of the optical signal-under-test, the electrical signal having a signal-to-noise ratio; and
   the optical domain optical signal sampling device additionally comprises means for increasing the signal-to-noise ratio of the electrical signal.

15. The optical domain optical signal sampling device of claim 14, in which:
   the optical signal-under-test is linearly polarized and has a direction of polarization; and
   the means for increasing the signal-to-noise ratio includes:
      means for linearly polarizing the optical sampling pulses with a direction of polarization orthogonal to the direction of polarization of the optical signal-under-test, and
      a polarization analyzer interposed between the semiconductor saturable absorber and the light detector, the polarization analyzer having a polarization direction of maximum transmission parallel to the direction of polarization of the optical signal-under-test.

16. The optical domain optical signal sampling device of claim 15, in which the optical signal input includes means for linearly polarizing the optical signal-under-test.

17. The optical domain optical signal sampling device of claim 14, in which:
   the optical signal-under-test is linearly polarized and has a direction of polarization; and
   the means for increasing the signal-to-noise ratio includes:
      quantum wells in the semiconductor saturable absorber,
      means for circularly polarizing the optical sampling pulses, and
      a polarization analyzer interposed between the semiconductor saturable absorber and the light detector, the polarization analyzer having a polarization direction of maximum transmission orthogonal to the direction of polarization of the optical signal-under-test.

18. The optical domain optical signal sampling device of claim 17, in which the optical signal input includes means for linearly polarizing the optical signal-under-test.

19. The optical domain optical signal sampling device of claim 14, in which the means for increasing the signal-to-noise ratio includes:
   quantum wells in the semiconductor saturable absorber;
   means for deriving left-handed and right-handed circularly polarized optical sampling pulse components from the optical sampling pulses and for illuminating a first region and a second region of the semiconductor saturable absorber with the left-handed and the right-handed circularly polarized optical sampling pulse components, respectively,
   means for deriving from the optical signal-under-test a first polarization component and a second polarization component, the polarization components having orthogonal directions of polarization, and for illuminating the first region and the second region of the semiconductor saturable absorber with the first and the second polarization components, respectively; and
   first and second polarization analyzers interposed between the semiconductor saturable absorber and the light detector in the path of optical samples generated from the first and the second polarization components, respectively, the first and the second polarization analyzers each having a respective polarization direction of maximum transmission orthogonal to the direction of polarization of the first and the second polarization components, respectively.

* * * * *